United States Patent [19]

Koto

[11] Patent Number: 4,480,868
[45] Date of Patent: Nov. 6, 1984

[54] MOTOR TRUCK BODY STRUCTURE

[75] Inventor: Masaaki Koto, Hiroshima, Japan

[73] Assignee: Toyo Kogyo Co., Ltd., Hiroshima, Japan

[21] Appl. No.: 407,625

[22] Filed: Aug. 12, 1982

[30] Foreign Application Priority Data

Aug. 13, 1981 [JP] Japan .................................. 56-127183

[51] Int. Cl.³ ............................................ B62D 33/06
[52] U.S. Cl. ..................................... 296/190; 296/66; 297/335
[58] Field of Search ................. 296/37.14, 51, 56, 76, 296/106, 63, 64, 65 R, 66, 68, 69, 67, 146, 183, 166, 10, 99 R, 190; 297/14, 15, 331, 335, 336, 337, 341

[56] References Cited

U.S. PATENT DOCUMENTS

| | | | |
|---|---|---|---|
| 1,933,623 | 11/1933 | Gordon | 296/76 |
| 2,102,110 | 12/1937 | Burkey | 296/106 |
| 2,602,691 | 7/1952 | Doty | 296/66 |
| 2,959,448 | 11/1960 | Bogater et al. | 296/106 |
| 3,169,792 | 2/1965 | Viquez | 296/65 R |
| 3,398,985 | 8/1968 | Rhoades | 296/106 |
| 3,729,224 | 4/1973 | Hathaway, Jr. | 296/166 |
| 3,770,312 | 11/1973 | Shadburn | 296/146 |
| 3,829,151 | 8/1974 | Fellenstein | 296/64 |

FOREIGN PATENT DOCUMENTS 50-114815  9/1975  Japan .
875049  8/1961  United Kingdom .................. 296/67

Primary Examiner—Robert B. Reeves
Assistant Examiner—Dennis H. Pedder
Attorney, Agent, or Firm—Fleit, Jacobson, Cohn & Price

[57] ABSTRACT

A motor truck body structure including a cabin and a load carrying rear body. The cabin includes a cabin body having a rear end opening provided with an upper rear panel and a lower rear panel. The upper rear panel is swingable from an upright position upwardly and rearwardly to an open position. The lower rear panel is also swingable from an upright position downwardly and rearwardly to an open position. The rear body includes a load carrying floor panel having an opening at the front portion where a movable floor panel segment is mounted for rearward and upward swinging movement. The lower rear panel is provided with a seat cushion and the floor panel segment with a seat back cushion so that an auxiliary seat can be formed when the panels are opened.

6 Claims, 4 Drawing Figures

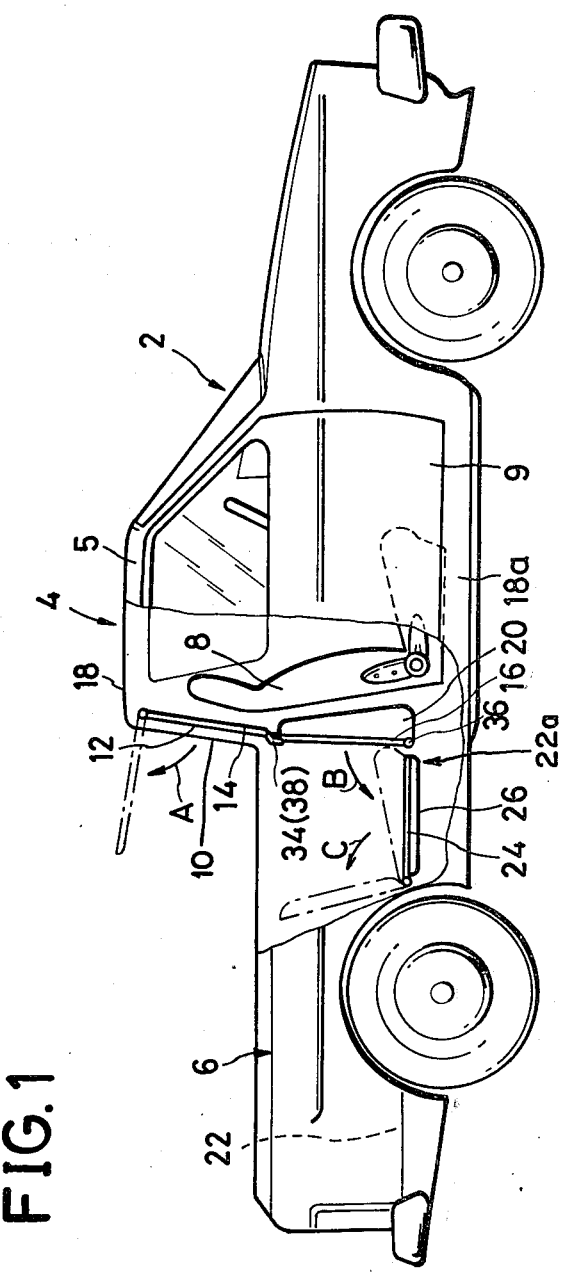
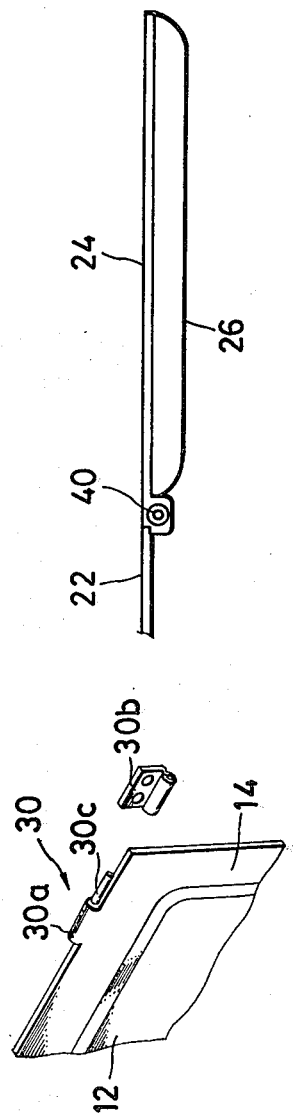
FIG. 1
FIG. 3
FIG. 4

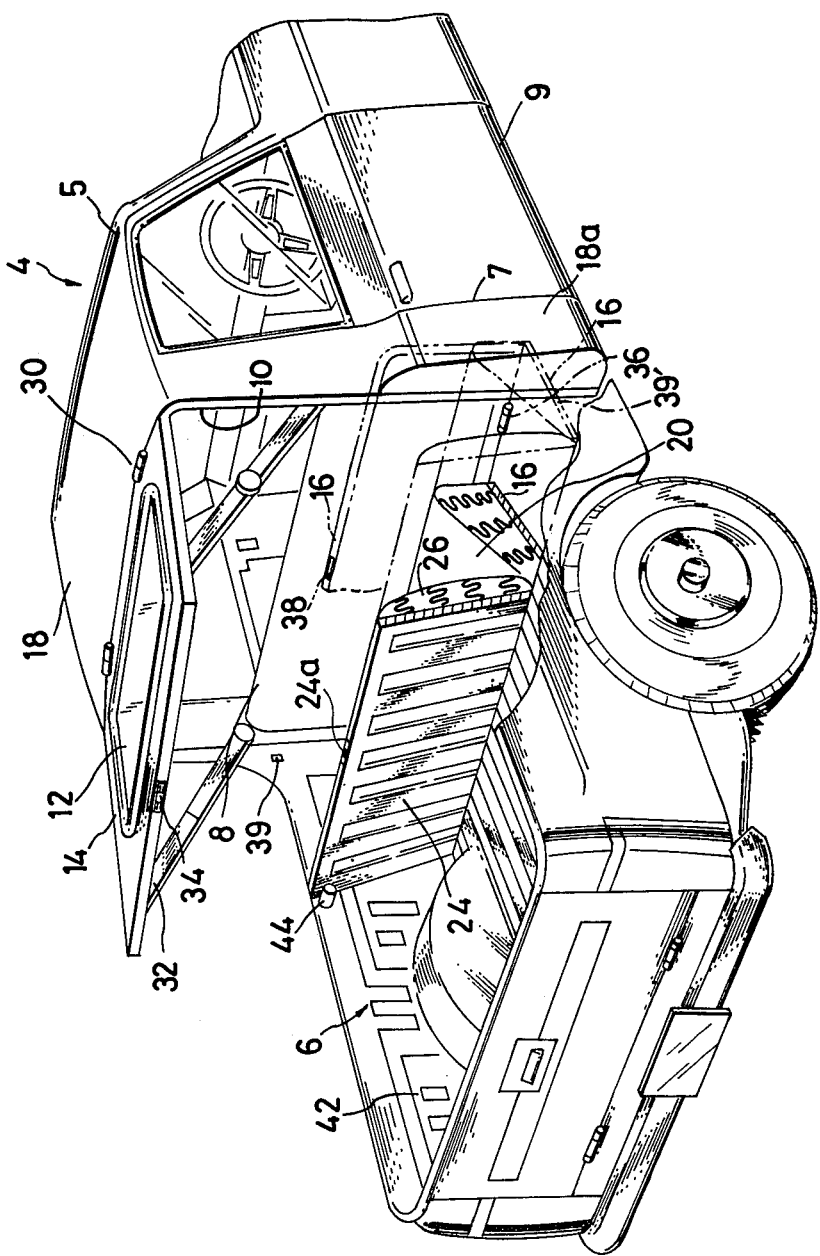

MOTOR TRUCK BODY STRUCTURE

The present invention relates to motor trucks and more particularly to body structures for motor trucks.

Conventionally, motor trucks have a body structure including a front cabin and a load carrying rear body which is separated from the cabin. In Japanese utility model application 49-24206 filed on Feb. 28, 1974 and disclosed for public inspection on Sept. 19, 1975 under the disclosure number 50-114815, there is proposed a motor truck body structure which includes a cabin provided at the rear wall thereof with a sliding door so that the cabin can be opened to the rear body. The seat in front of the sliding door is foldable or retractable so that long-sized loads can be put on the truck body throughout the cabin and the rear body. The body structure as proposed by the Japanese utility model is considered to increase the utility of the motor truck to a certain extent.

The present invention has as an object to provide a motor truck body structure by which the utility of the motor truck can be greatly increased.

Another object of the present invention is to provide a motor truck body structure in which the cabin can be substantially fully opened to the rear body.

A further object of the present invention is to provide a motor truck body structure in which additional seats can be provided when desired between the cabin and the rear body.

According to the present invention, the above and other objects can be accomplished by a motor truck body structure comprising a cabin and a rear body, said cabin having a cabin body formed with a rear end opening provided with an upper rear panel and a lower rear panel, said upper rear panel being hinged at an upper edged portion with said cabin body so that it can be swung from an upright position upwardly and rearwardly to an open position, said lower rear panel being also hinged at a lower edge portion thereof so that it can be swung from an upright position downwardly and rearwardly to an open position, said upper and lower rear panels being able to cooperate with each other when they are in the upright positions to close the rear end opening of the cabin body. In a preferable aspect of the present invention, the lower rear panel is provided at a side facing to an inside of the cabin body in the upright position with seat cushion means so that an auxiliary seat is formed thereby when it is swung downwardly and rearwardly. The rear body may include a floor structure having a movable floor panel segment provided at a front end portion thereof, said movable floor panel segment being hinged at a rear edge portion thereof to the floor structure so that it can be moved between a substantially horizontal retracted position and an erected position wherein it is erected from said floor structure, the movable floor panel segment being provided at a lower side with seat back cushion means so that a seat back is provided when the floor panel segment is in the erected position for cooperation with the auxiliary seat provided by the lower rear panel. Suitable means such as stay means may be provided for maintaining the upper rear panel at the open position.

The above and other objects and features of the present invention will become apparent from the following descriptions of a preferred embodiment taking reference to the accompanying drawings, in which:

FIG. 1 is a partially cut-away side view of a motor truck in accordance with one embodiment of the present invention;

FIG. 2 is a perspective rear view of the motor truck shown in FIG. 1;

FIG. 3 is a fragmentary perspective view showing a hinge mechanism for the upper rear panel; and FIG. 4 is a side view of a floor panel segment used in the motor truck shown in FIG. 1.

Referring now to the drawings, particularly to FIGS. 1 and 2, there is shown a motor truck 2 having a body structure comprised of a cabin 4 and a load carrying rear body 6. The cabin 4 comprises a cabin body 5 including a roof 18 and side panels 18a. In each of the side panels 18a, there is provided a side door opening 7 where a side door 9 is attached as is well known in the art. In the cabin 4, there is provided a seat 8 which is of a conventional type.

The cabin body 5 is formed with a rear opening 10 and an upper rear panel 14 and a lower rear panel 16 are mounted on the cabin body 5 at the rear opening 10. The upper rear panel 14 is provided with a transparent window glass 12 and is mounted at the upper edge portion thereof on the rear edge portion of the roof 18 of the cabin body 5 through hinge structures 30. As shown in FIG. 3, the hinge structure 30 is constituted by a hinge fitting 30a formed on the upper edge of the upper rear panel 14 and a hinge fitting 30b attached to the rear edge portion of the roof 18. A hinge pin 30c is removably inserted through the hinge fittings 30a and 30b so that the upper rear panel 14 can be removed from the cabin body 5 as desired. The panel 14 is movable between a closed or upright position as shown by solid lines in FIG. 1 and an open position as shown by phantom lines. To move the upper rear panel 14 to the open position, the panel 14 is swung upwardly and rearwardly as shown by an arrow A in FIG. 1. The upper rear panel 14 is provided at the side edge portions with foldable stays 32 which have one end portion attached to the panel 14 and the other end portion attached to the insides of the side panels 18a of the cabin body 5. The stays 32 are extended when the panel 14 is in the open position to maintain the panel 14 in the open position.

The lower rear panel 14 is attached at the lower edge portion thereof to a rear lower portion of the cabin body 5 through hinge structures 36 so that it can be moved from an upright or closed position as shown by solid lines in FIG. 1, to an open position by swinging it downwardly and rearwardly as shown by an arrow B in FIG. 1. As shown in FIG. 2, the upper rear panel 14 is provided at the lower edge portion with a locking device 34 and the lower rear panel 14 is provided at the upper edge portion with a locking device 38 for cooperation with the locking device 34 on the upper rear panel 14. The side panels 18a are also provided at the inner surfaces with locking devices 39 and the lower rear panel 16 is provided at the side edge portions with locking devices 39' for cooperation with the locking devices 39 on the side panels 18a of the cabin body 5. Thus, it will be understood that the upper and lower rear panels 14 and 16 can be locked in their closed positions. Further, the panels can be moved to their open positions to thereby open the inside of the cabin 4 rearwardly.

The rear body 6 includes a load carrying floor panel 22 which has an opening 22a at the front end portion thereof. At the opening 22a, there is provided a movable floor panel segment 24 which is mounted on the floor panel 22 by means of hinge mechanisms 40. Specifically, the panel segment 24 is connected at the rear edge portion with the front edge portion of the floor panel 22 through the hinge mechanisms 40 as shown in FIG. 4. Thus, the panel segment 24 is movable between a horizontal position as shown by solid lines in FIG. 1 and an erected position as shown by phantom lines. In order to move the panel segment 24 to the erected position, the panel segment 24 is swung upwardly and rearwardly as shown by an arrow C in FIG. 1. It will be noted in FIG. 4, the hinge mechanisms 40 are so constructed that the panel segment 24 is substantially flush with the floor panel 22.

The lower rear panel 16 is provided at the front side which faces to the inside of the cabin 4 with a seat cushion 20. The floor panel segment 24 is provided at the lower side with a seat back cushion 26. Thus, when the floor panel segment 24 is moved to the erected position and the lower rear panel 16 is moved to the open position, an auxiliary seat is formed behind the seat 8 by the seat cushion 20 and the seat back cushion 26. The floor panel segment 24 is provided at the front edge portion with a locking device 24a which functions to lock the segment 24 in the horizontal position. As shown in FIG. 2, the rear body 6 includes side panels 42 extending along the side edges of the floor panel 22 and each of the side panels 42 is provided at the inner side thereof with a stopper pin 44 which is adapted to be engaged with the floor panel segment 24 when the segment 24 is moved to the erected position to thereby maintain the panel segment in the erected position. It will therefore be understood that, by opening the upper and lower rear panels 14 and 16 and moving the floor panel segment 24 to the erected position, an auxiliary seat is provided behind the seat 8 and the utility of the truck can further be increased.

The invention has thus been shown and described with reference to a specific embodiment. However, it should be noted that the invention is in no way limited to the details of the illustrated structures, but changes and modifications may be made without departing from the scope of the appended claims.

I claim:

1. A motor truck body structure comprising a cabin and a rear body, said cabin having a cabin body formed with a rear end opening provided with an upper rear panel and a lower rear panel, said upper rear panel being hinged at an upper edge portion with said cabin body so that it can be swung from an upright position upwardly and rearwardly to an open position, said lower rear panel being also hinged at a lower edge portion thereof so that it can be swung from an upright position downwardly and rearwardly to an open position, said upper and lower rear panels being able to cooperate with each other when they are in the upright positions to close the rear end opening of the cabin body, said lower panel being provided at the side facing the inside of the cabin body when in the upright position with seat cushion means so that an auxiliary seat is formed thereby when it is swung downwardly and rearwardly, said rear body including a load carrying floor structure having a movable floor panel segment provided at a front end portion thereof, said movable floor panel segment being hinged at a rear edge portion thereof to the floor structure so that it can be moved between a substantially horizontal retracted position and an erected position wherein it is erected from said floor structure, the movable floor panel segment being provided at a side facing downwardly when in the horizontal retracted position with seat back cushion means so that a seat back is provided when the floor panel segment is in the erected position for cooperation with the auxiliary seat provided by the lower rear panel.

2. A motor truck body structure in accordance with claim 1 which includes support means for maintaining said upper rear panel in the open position.

3. A motor truck body structure in accordance with claim 2 in which said support means is foldable stay means.

4. A motor truck body structure in accordance with claim 1 including stopper means in said rear body for holding the floor panel segment in the erected position.

5. A motor truck body structure in accordance with claim 1 in which said floor panel segment is attached to the floor structure through hinge means which maintains the floor panel segment substantially flush with said floor structure in the retracted position thereof.

6. A motor truck body structure comprising a cabin and a rear body, said cabin having a cabin body formed with a rear end opening provided with an upper rear panel and a lower rear panel, said upper rear panel being hinged at an upper edge portion with said cabin body so that it can be swung from an upright position upwardly and rearwardly to an open position, said lower rear panel being also hinged at a lower edge portion thereof so that it can be swung from an upright position downwardly and rearwardly to an open position, said upper and lower rear panels being able to cooperate with each other when they are in the upright positions to close the rear end opening of the cabin body, said lower rear panel being provided at a side facing the inside of the cabin body when in the upright position with seat cushion means so that an auxiliary seat is formed thereby when it is swung downwardly and rearwardly, said rear body including a load carrying floor structure having a movable floor panel segment provided at a front end portion thereof, said movable floor panel segment being hinged at a rear edge portion thereof to the floor structure so that it can be moved between a substantially horizontal retracted position and an erected position wherein it is erected from said floor structure, the movable floor panel segment being provided at a side facing downwardly in the horizontal retracted position with seat back cushion means so that a seat back is provided when the floor panel segment is in the erected position for cooperation with the auxiliary seat provided by the lower rear panel, support means for maintaining said upper rear panel in the open position, said floor panel segment being attached to the floor structure through hinge means which maintains the floor panel segment substantially flush with said floor structure in the retracted position thereof.

* * * * *